Oct. 20, 1931.  J. H. HAGEN  1,827,873
FREEZING MACHINE
Filed April 28, 1927   2 Sheets-Sheet 1
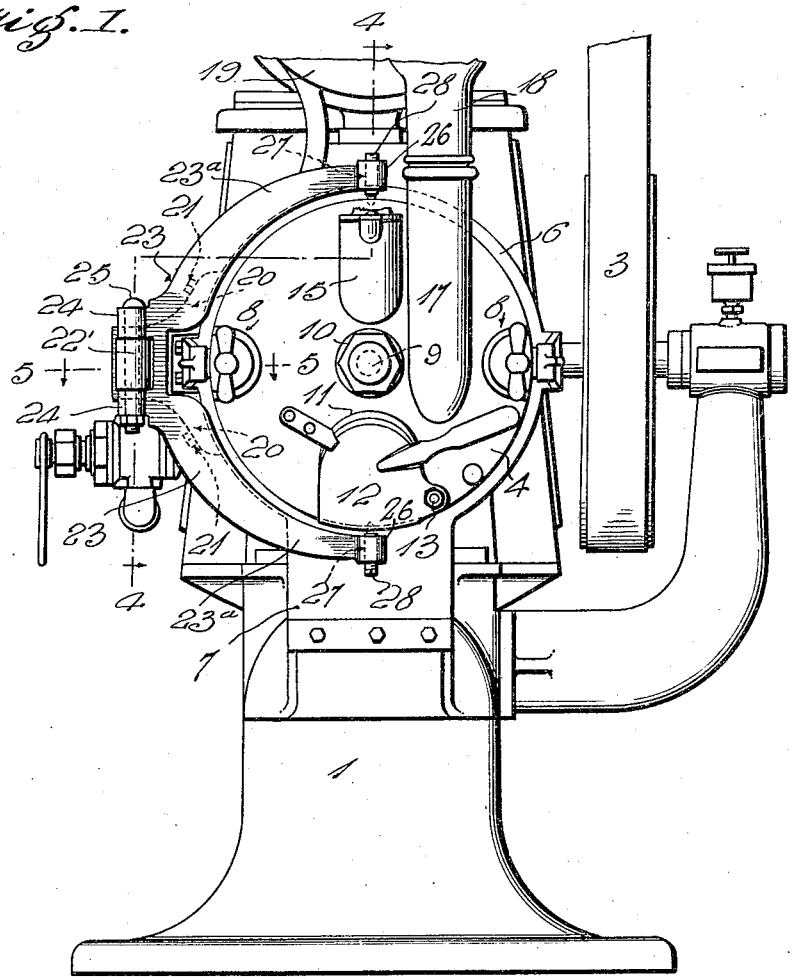
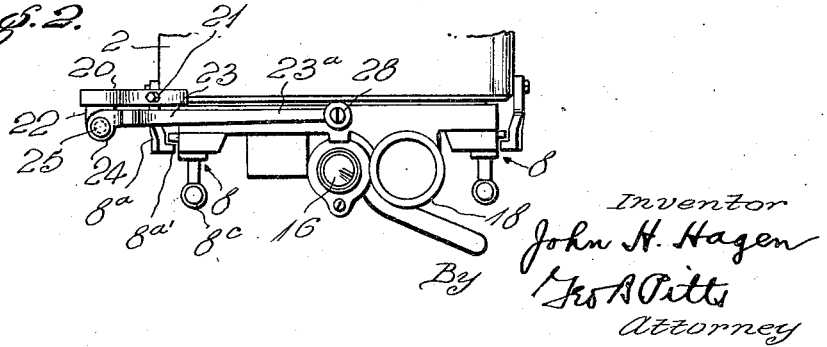

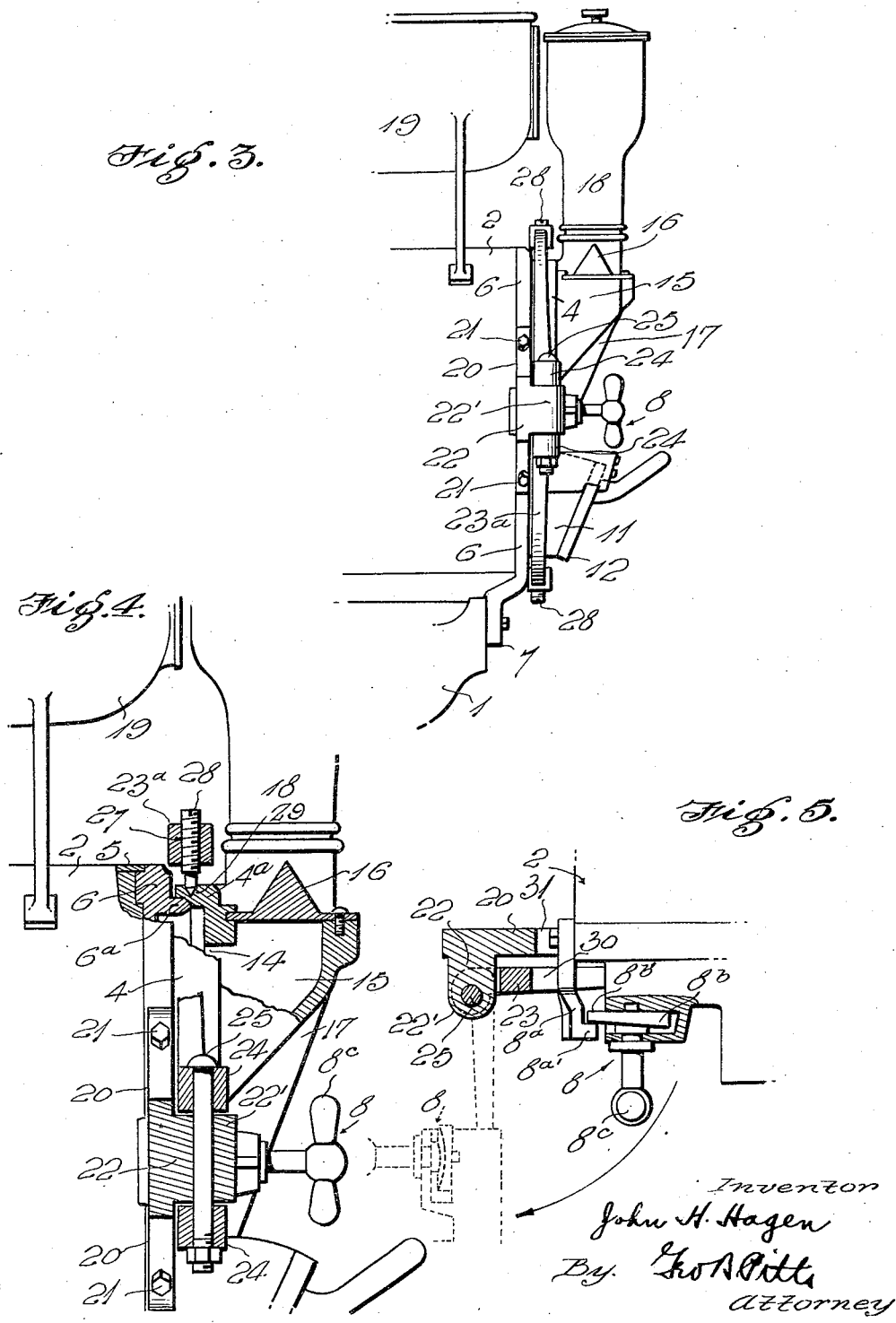

Patented Oct. 20, 1931

1,827,873

UNITED STATES PATENT OFFICE

JOHN H. HAGEN, OF CANTON, OHIO, ASSIGNOR TO THE H. H. MILLER INDUSTRIES COMPANY, OF CANTON, OHIO, A CORPORATION OF OHIO

FREEZING MACHINE

Application filed April 28, 1927. Serial No. 187,161.

This invention relates to a machine for freezing ice cream, ices and other foods and delicacies, more particularly to the mounting of one of the heads for the freezing cylinder.

In machines of this character the front head is made removable for assembly and disassembly of the agitating mechanism within the freezing cylinder, and to permit inspection and cleaning of such mechanism. By reason of the fact that the shaft for the agitating mechanism has a bearing in the front head, it has been the practice to removably secure the front head on the front or open end of the freezing cylinder so that in positioning the head or removing it from the cylinder end, it could be moved in a substantially axial direction. Where the freezing cylinder is of relatively large capacity, the weight of the front head is too great to enable the operator at least without undue physical effort, to lift the head into position or to remove it.

The object of my invention is to provide a relatively simple mounting for the front head so arranged that it may be moved axially sufficiently to engage or disengage the shaft of the agitating mechanism and then laterally, whereby all manual lifting is eliminated.

Other objects of the invention will be apparent to those skilled in the art to which my invention relates from the following description taken in connection with the accompanying drawings, wherein Fig. 1 is a front view of a freezing machine having a mounting for the front head embodying my invention; parts of the machine being broken away.

Fig. 2 is a top plan view of certain of the parts shown in Fig. 1.

Fig. 3 is a fragmentary side view of the freezing machine.

Fig. 4 is a section on the line 4—4 of Fig. 1.

Fig. 5 is a section on the line 5—5 of Fig. 1.

In the drawings, 1 indicates a suitable support for a freezing cylinder indicated as an entirety at 2. Within the cylinder 2 is a suitable agitating, scraping and ejecting mechanism, which may be similar to the construction shown in Patent No. 945,570 issued to John C. Miller; such mechanism may be driven by a power means 3. The cylinder comprises a rear head (not shown) and a front head 4 to which reference will later be made. The cylinder 2 comprises an inner wall (not shown), a refrigerating means (not shown) around the inner wall and an outer wall 5 (see Fig. 4). The inner and outer walls are secured at their front ends to a ring 6 which also spaces these walls apart. The ring 6 may have a depending member 7 secured to the support 1 to support the front end of the cylinder thereon. The ring 6 has an out-standing rib 6a with which the flange 4a of the head 4 engages to form a joint between them, the abutting faces of the rib and flange being ground to insure a liquid tight joint. 8 indicates pairs of interlocking devices, one device of each pair removably engaging the other device of the pair, to removably secure the head in position, that is, with the ground faces of the rib 6a and flange 4a in engagement. I preferably provide two pairs of interlocking devices 8 at diametrically opposite sides and preferably in a horizontal plane cutting the axis of the cylinder 2. Each pair of interlocking devices comprises an arm 8a fixed at its inner end to the adjacent portion of the ring 6 and provided at its free end with an inturned flange 8a' and a rotatable member 8b having a portion 8b' adapted to engage the flange 8a' when rotated to one position and to free it when rotated to another position; the device 8b having a handle 8c, whereby it may be readily operated. The agitating, scraping mechanism within the cylinder includes a shaft 9 (see dotted lines in Fig. 1) which is driven by the power means 3. The front end of the shaft has a bearing in a tubular member 10 carried by the front head 4 and extending axially of the shaft. By mounting the shaft in the head, the agitating members may operate close to the inner face of the front head and thus eliminate within the cylinder holding space for material outside the zone or travel of the agitating and scraping elements, which space—if present—would materially affect the uniform treatment of the material to be frozen. 11 indicates a wall defining a discharge opening formed in the head. 12 indicates a valve pivoted at 13 on the head and movable relative to the edge of the wall 11 to open and close the discharge opening. 14 indicates an opening formed in the upper portion of the head. 15 indicates a duct leading to the opening 14, the upper end of the duct having a cover 16. 17 indicates a supply duct, preferably formed integrally with the head 4 and leading to an opening (not shown) formed in the cylinder head; this duct permitting the supply of flavoring material into the cylinder 2. The upper end of the duct 17 carries a funnel or hopper 18. 19 indicates a batch tank for measuring the batches of material to be treated.

20 indicates a supporting member secured to one lateral side of the ring 6, preferably by cap screws 21. 22 indicates an outwardly extending bracket on said supporting member carrying at its outer end a knuckle 22' disposed in a plane extending horizontally through the axis of the cylinder 2. 23 indicates a member having spaced knuckles 24 arranged to align with the knuckle 22' to receive a pivot pin 25, whereby the member 23 is swingably mounted on the supporting member 20. The member 23 comprises a pair of curved arms 23a, 23a, extending around the adjacent edge portions or flange 4a of the head 4 and carrying at their free ends bosses 26 having interiorly threaded openings 27 aligned with each other, the axes of the openings being in a vertical plane cutting the axis of the cylinder 2. 28 indicates threaded pins mounted in the openings 27 and adjustable therein. The inner ends of the pins 28 are of conical shape and fit into correspondingly shaped recesses 29 formed in the outer side wall or flange 4a of the head 4 and serving to trunnion or pivot the head thereon. By mounting the head 4 on vertically arranged trunnions, it can be maintained in parallelism to the open end of the cylinder while the arms 23a swing toward or from the cylinder, so that the bearing member 10 can, without binding, engage the shaft 9 when assembling the head or disengage therewith when disassembling the head. The axis of the pivot 25 being substantially in the plane of the head and the arc of movement of the tubular member through that portion of its swing necessary to operatively engage or disengage the shaft being relatively short, danger of binding is eliminated.

By swinging the arms 23a through an arc of 90° or more and moving the head on its trunnion, ready access may be had to the interior of the cylinder 2. As will be understood from Fig. 5, the supporting member 20 extends a relatively long distance from the ring 6, so that the head 4, when swung to the position shown in dotted lines in this figure, will clear the adjacent portions of the cylinder 2, and ample metal is provided to form cut-aways 30, 31, in the central portion of the swingable member 23 and member 20 to accommodate the adjacent interlocking devices 8. By connecting the ring to the support 1, it is rigidly held in position at all times and hence danger of the weight of the member 23 and head 4 when the latter is removed, distorting the thin walls of the cylinder is eliminated.

To those skilled in the art to which my invention relates many alterations in construction and widely differing applications and embodiments of my invention will suggest themselves without departing from the spirit and scope thereof. My disclosures and the description herein are purely illustrative and are not intended to be in any sense limiting.

What I claim is:

In a freezing machine, the combination with a cylinder, of a head engaging the open end of said cylinder and formed with a discharge opening in its lower portion and adapted to support the shaft mounted within said cylinder, a supporting member secured to one side portion of said cylinder, a member swingably mounted on said supporting member on an axis disposed outwardly of the wall of said cylinder and having diverging portions, trunnions between said head and the diverging portions of said swingable member disposed in a vertical plane cutting the axis of said cylinder, a wall surrounding said discharge opening and extending outwardly beyond the adjacent diverging portion of said swingable member, and a plate movable relative to the outer end of said surrounding wall to open and close the opening therethrough.

In testimony whereof, I have hereunto subscribed my name.

JOHN H. HAGEN.